United States Patent
Crane et al.

(10) Patent No.: US 9,182,591 B2
(45) Date of Patent: Nov. 10, 2015

(54) SYSTEM AND METHOD FOR ELECTROWETTING ACTUATION UTILIZING DIODES

(71) Applicants: Nathan B. Crane, Lutz, FL (US); Qi Ni, St. Petersburg, FL (US)

(72) Inventors: Nathan B. Crane, Lutz, FL (US); Qi Ni, St. Petersburg, FL (US)

(73) Assignee: UNIVERSITY OF SOUTH FLORIDA, Tampa, FL (US)

( * ) Notice: Subject to any disclaimer, the term of this patent is extended or adjusted under 35 U.S.C. 154(b) by 0 days.

(21) Appl. No.: 14/471,785

(22) Filed: Aug. 28, 2014

(65) Prior Publication Data

US 2014/0367258 A1    Dec. 18, 2014

Related U.S. Application Data

(63) Continuation-in-part of application No. 13/525,806, filed on Jun. 18, 2012, now Pat. No. 8,858,772, which is a continuation-in-part of application No. PCT/US2010/060763, filed on Dec. 16, 2010.

(60) Provisional application No. 61/286,944, filed on Dec. 16, 2009.

(51) Int. Cl.
*G02B 26/00* (2006.01)
*B01L 3/00* (2006.01)
*G02B 21/32* (2006.01)

(52) U.S. Cl.
CPC ......... *G02B 26/005* (2013.01); *B01L 3/502792* (2013.01); *B01L 2300/0819* (2013.01); *B01L 2400/0427* (2013.01); *G02B 21/32* (2013.01)

(58) Field of Classification Search
CPC .. B01L 3/502784–3/502792; B01L 2400/0427
See application file for complete search history.

(56) References Cited

U.S. PATENT DOCUMENTS

| | | | |
|---|---|---|---|
| 6,911,132 B2 | 6/2005 | Pamula et al. | |
| 7,132,614 B2 | 11/2006 | Beerling | |
| 7,569,129 B2 | 8/2009 | Pamula et al. | |
| 8,163,150 B2 | 4/2012 | Vann et al. | |
| 8,858,772 B2 * | 10/2014 | Crane et al. | 204/600 |

(Continued)

FOREIGN PATENT DOCUMENTS

WO    2011042835 A1    4/2011

OTHER PUBLICATIONS

International Search Report and Written Opinion for PCT/US2010/060763 (filing date: Dec. 16, 2010) with a mailing date of Oct. 6, 2011; Applicant: University of South Florida et al.

(Continued)

*Primary Examiner* — Alexander Noguerola
(74) *Attorney, Agent, or Firm* — Smith & Hopen, P.A.; Molly L. Sauter

(57) ABSTRACT

An electrowetting system and method for the movement of a droplet across the surface of a substrate, utilizing an applied voltage. The actuation of the droplet is achieved by introducing a diode into the idealized electrical circuit of the electrowetting system. The diode is in parallel with a capacitor (dielectric) and effectively shorts the droplet on the side of a lower potential electrode so that the entire voltage drop is across the dielectric over the higher potential electrode. This difference in potential creates an energy imbalance that is effective in moving the droplet towards the higher potential electrode. If the voltage polarity is reversed, the direction of actuation will also be reversed.

20 Claims, 5 Drawing Sheets

(56) References Cited

U.S. PATENT DOCUMENTS

| | | | |
|---|---|---|---|
| 2004/0055536 | A1 | 3/2004 | Kolar et al. |
| 2004/0055891 | A1 | 3/2004 | Pamula et al. |
| 2008/0210558 | A1 | 9/2008 | Sauter-Starace et al. |
| 2009/0103159 | A1 | 4/2009 | Cheng et al. |
| 2012/0247960 | A1 | 10/2012 | Crane et al. |
| 2012/0256274 | A1* | 10/2012 | Riess et al. .................. 257/408 |

OTHER PUBLICATIONS

International Preliminary Report of Patentability for PCT/US2010/060763 (filing date: Dec. 16, 2010) with a priority date of Dec. 16, 2009; Applicant: University of South Florida et al.

Mugele, F., Baret, J.-C., 2005, "Electrowetting: From Basics to Applications," Journal of Physics.Condensed Matter, 17(28) pp. R705-R774.

Cho, S. K., Moon, H., Kim, C.-J., Feb. 2003, "Creating, Transporting, Cutting, and Merging Liquid Droplets by Electrowetting-Based Actuation for Digital Microfluidic Circuits," Journal of Microelectromechanical Systems, 12(1) pp. 70-80.

Lynch, C. M., Volinsky, A. A., Khodayari, M., Crane, N. B., Demonstration of Continuous Electrowetting Actuation, Proceedings of ASME International Mechanical Engineering Congress and Exposition, IMECE 2010, Nov. 12-18, 2010, Vancouver, British Columbia, pp. 1-5.

K. Mohseni and E. S. Baird, Digitized heat transfer using electrowetting on dielectric, Nanoscale Microscale Thermophys. Eng. 11, pp. 99-108 (2007).

S. Kuiper and B. H. W. Hendriks, Variable-focus liquid lens for miniature cameras. Appl. Phys. Lett. vol. 85, No. 7, pp. 1128-1130 (2004).

C. G. Cooney, C. Y. Chen, M. R. Emerling, A. Nadim and J. D. Sterling, Electrowetting droplet microfluidics on a single planar surface. Microfluid. Nanofluid. vol. 2, pp. 435-446 (2006).

M. Washizu, Electrostatic Actuation of Liquid Droplets for Microreactor Applications. IEEE Trans. Ind. Appl. vol. 34, No. 4, pp. 732-737 (1998).

K. F. Bohringer, Modeling and Controlling Parallel Tasks in Droplet-Based Microfluidic Systems, IEEE Trans. Comput-Aided Des. Integr. Circuits Syst. vol. 25, No. 2, pp. 334-344 (2006).

Han-Sheng Chuang, A. Kumar and S. T. Wereley, Open Optoelectrowetting Droplet Actuation, Appl. Phys. Lett. 93, 064104 (2008).

P.Y. Chiou, H. Moon, H. Toshiyoshi, C. J. Kim and M. C. Wu, Light Actuation of Liquid by Optoelectrowetting, Sens. Actuator A-Phys. 104, 222-228 (2003).

S. K. Fan, H. P. Yang, T. T. Wang and W. Hsu, Asymmetric Electrowetting-Moving Droplets by a Square Wave, Lab on a Chip 7, pp. 1330-1335 (2007).

Nathan Brad Crane, Alex A. Volinsky, Vivek Ramadoss, Michael Nellis, Pradeep Mishra and Xiaolu Pang, Analysis and Measurement of Forces in an Electrowetting-Driven Oscillator, Materia. Res. Soc. Symp. Proc., vol. 1052, pp. 285-291, DD8.1 (2007).

B. M. Grafov, On the Theory of the Electrochemical Diode, Russian Chemical Bulletin 13, pp. 763-769 (1964).

I. Oshida, Theory of Electrochemical Diodes, J. Phys. Soc. Jpn. vol. 15, No. 12, pp. 2288-2294 (1960).

Florian Krogmann, Hong Qu, Wolfgang Monch and Hans Zappe, Push/Pull actuation using opto-electrowetting, Sens Actuators A Phys 141, pp. 499-505 (2008).

S. Bains, Electrowetting boosts speed, color, contrast. Laser Focus World 40, 43 (2004).

Khodayari et al., Long life Electrochemical Diodes for Continuous Electrowetting. Journal of Electrochemical Society. 2014. vol. 161 (No. 60): E105-E111.

Nelson et al., Continuous electrowetting via electrochemical diodes. Lab Chip. 2011. vol. 11: 2149-2152.

* cited by examiner

SYSTEM AND METHOD FOR ELECTROWETTING ACTUATION UTILIZING DIODES

CROSS REFERENCE TO RELATED APPLICATION

This application is a continuation-in-part of currently pending U.S. patent application Ser. No. 13/525,806 filed on Jun. 28, 2012, which claims priority to International Application, Serial Number PCT/US2010/060763 filed Dec. 16, 2010, which claims priority to U.S. provisional patent application No. 61/286,944, filed on Dec. 16, 2009, the contents of which are hereby incorporated by reference.

GOVERNMENT SUPPORT

This invention was made with government support under Grant Nos. CMMI-0600266 and CMMI-0927637 awarded by the National Science Foundation. The government has certain rights in the invention.

FIELD OF THE INVENTION

This invention relates to an electrowetting system. More specifically, it relates to an electrowetting system for the smooth continuous movement of a droplet across a single circuit using the continuous application of a direct current voltage.

BACKGROUND OF THE INVENTION

Recent technical advances have enabled the manipulation of small volumes of fluids, often in discrete droplets. Many of these systems utilize the phenomena of electrowetting to manipulate the small electrical droplets. Electrowetting on dielectric (EWOD) is the reduction in apparent contact angle of a fluid droplet using the capacitance of a dielectric layer which lies between the droplet and an electrode. Applying voltage across the barrier, between the droplet and electrode, causes charge migration to occur within the droplet and within the electrode which modifies the apparent surface energy of the droplet, causing its apparent contact angle to be reduced.

Applications for electrowetting, in general, are diverse, ranging from the shaping of micro lenses, fiber optics switching, display technology, and optical filters, to the creation of small low-power-consumption motors. When looking at applications for EWOD droplet transport, perhaps the most significant is lab-on-a-chip designs. Additionally, the use of droplet motion to assist in assembly of nano- and micro-scale components for microdevices holds promise.

Droplet movement by spatially asymmetric electrowetting, wherein only a portion of the droplet has its contact angle reduced resulting in the droplet motion, is known in the prior art. The prior art uses successive activation of discrete small electrodes, several of which are covered by the droplet. As each electrode is activated and the contact angle above it is reduced, the droplet is "handed off" from one electrode to another electrode. This hand-off accomplishes droplet movement in successive discrete steps, each step having a magnitude equivalent to the size of the electrodes. These prior art electrowetting systems require complex control systems to control the activation of the electrodes in the proper sequence and exhibiting the proper timing. Moreover, because electrowetting behavior is related to the voltage squared, the behavior typically shows no significant dependence upon the polarity of the voltage applied to the electrodes.

Accordingly, what is needed in the art is an electrowetting system that provides a substantially smooth, continuous, movement of a droplet across a single circuit that does not require complex control systems to accomplish movement of the droplet along a surface. What is also needed in the art is an electrowetting system that is dependent on the polarity of the applied voltage, such that the actuation direction of the droplet can be changed by changing the polarity of the applied voltage.

However, in view of the prior art considered as a whole at the time the present invention was made, it was not obvious to those of ordinary skill in the art how the limitations of the art could be overcome.

SUMMARY OF INVENTION

The claimed invention is a novel electrowetting system for the movement of a droplet across a substrate utilizing a plurality of diodes under an applied voltage. In the claimed invention, the voltage polarity can be reversed to alter the direction of movement of the droplet.

In the present invention, the actuation of the droplet is achieved by introducing a diode into the idealized electrical circuit of the electrowetting system. The diode is in parallel with a capacitor (dielectric) and effectively shorts the droplet on the side of a lower potential electrode so that the entire voltage drop is across the dielectric over the opposite electrode. This creates an energy imbalance that moves the droplet towards the higher potential. If the voltage polarity is reversed, the direction of actuation will reverse as well.

Generally speaking, the electrowetting system includes: (1) an electrode layer adapted to act as a resistor; (2) a dielectric layer adapted to act as a capacitor disposed in overlying relation to the electrode layer; (3) a plurality of diodes adapted to act as diodes in parallel with the dielectric layer and disposed within the dielectric layer; (4) a hydrophobic surface treatment layer adapted to act as a capacitor in parallel with the dielectric layer and the plurality of diodes and disposed in overlying relation to the electrowetting system; (5) an electrolyte droplet disposed in overly relation to the hydrophobic surface treatment layer; and (6) a voltage applied to the electrowetting system, causing said electrolyte droplet to move due to a potential difference in the electrowetting system.

In an embodiment, the electrowetting system uses the current-rectifying properties of oxide films of the so-called valve metals to construct the diodes. By patterning an array of holes in the dielectric layer, under which lies a valve metal electrode, and applying a potential across the electrode, the side of the droplet above the anodic hole will have its contact angle reduced. As the droplet flows to cover the next-most-positively charged hole, the previously anodic hole will become cathodic (allowing current flow) and the newly-covered hole will become anodic, causing the contact angle to be reduced over it. This sequence is repeated until the potential is removed or the array of holes ends.

In an embodiment, electrochemical diodes are created by holes in the dielectric that expose an aluminum electrode to NaCl solution. The aluminum electrode self-passivates and prevents current flow in one direction. This creates a diode-like electrical behavior. Other salt and acidic solutions including Na2SO4, tartaric acid and citric acid could be used.

In an additional embodiment to improve the device lifetime, metal-semiconductors diodes are created by holes in the dielectric having a metal electrode that forms a metal-semiconductor diode with the underlying semiconductor substrate.

In an embodiment, a method of effecting movement of an electrolyte droplet on the surface of an electrowetting system comprising an electrode layer adapted to act as a resistor in the electrowetting system, a dielectric layer disposed in overlying relation to the electrode layer, the dielectric layer adapted to act as a capacitor in the electrowetting system and a plurality of diodes disposed within the dielectric layer, the plurality of metal-semiconductor diodes adapted to act as diodes in parallel with the dielectric layer includes, positioning an electrolyte drop on the surface of the electrowetting system and in overlying relation to two of the plurality of diodes and applying a voltage source across the electrode layer to establish a potential difference between the plurality of diodes, whereby movement of the electrolyte droplet is effected as a result of the potential difference between the plurality of diodes.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

Figure 1:
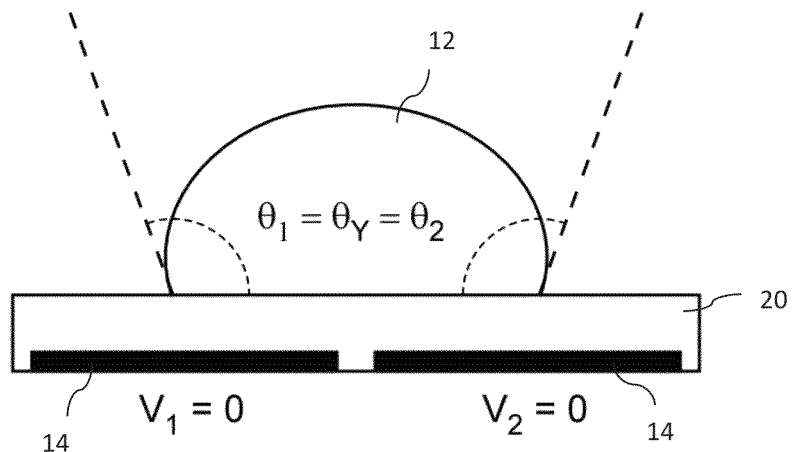
FIG. 1 depicts the natural, or Young's, contact angle when no voltage is applied as is known in the prior art.
Figure 2:
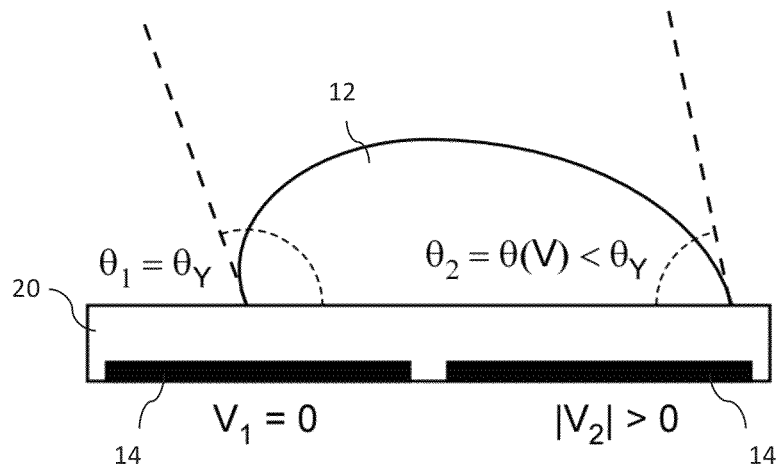
FIG. 2 depicts the reduced contact angle and the resulting droplet asymmetry, when voltage is applied only to the right-hand electrode in accordance with the prior art.

As collectively depicted in prior art FIGS. 1 and 2, electrowetting results in a reduction of contact angle in the presence of an electrical potential difference between the droplet 12 and the electrodes 14 that are incorporated into the substrate 20 that the droplet 12 lies upon. In order to reduce the contact angle of only a portion of the droplet 12, thereby achieving droplet motion/transport, there must exist a difference in potential only between a portion of the droplet 12 and the substrate 20. In other words, the potential difference between the droplet 12 and the substrate 20 must be significantly greater in one portion of the droplet 12 than in another portion of the droplet 12. In order to achieve this asymmetry in electrical potential within the droplet 12, the substrate 20 must be manipulated. As previously discussed regarding the prior art, the paradigm has been to use a series of small electrodes 14 embedded within the substrate 20, several of which are covered by the droplet 12 at any one time. In this way, only the portion of droplet 12 immediately above an energized electrode 14 has its contact angle reduced, and motion can be achieved by sequentially energizing the desired electrodes 14 so that the leading edge of the droplet 12 repeatedly experiences contact angle reduction, causing the droplet 12 to move forward a small amount in each step as the electrodes 14 are energized.

An exemplary simplified electrical schematic of the prior art devices is illustrated with reference to FIG. 3. The simplified circuit includes the droplet 12, a voltage source 16, a switch 18 to control the actuation of each of the electrodes in the series of electrodes 14 and a dielectric layer 20. The dielectric layer 20 is modeled as idealized electrical components, namely capacitors 40. If an additional composite dielectric layer is used, such as a dielectric layer topped by a surface treatment, there would be a second capacitor placed in series with the capacitors 40 representing the dielectric layer. In this design, the electrode 14 used is highly conductive and as such is modeled to be at equipotential with the applied voltage source 16. The design of this electrowetting system necessitates grounding of the circuit through the top of the droplet 12 to establish the difference in electrical potential between a portion of the droplet 12 and the electrode 14. In the case of static electrowetting wherein the droplet 12 does not move, electrical contact to the droplet 12 can be made by placing a wire into the bulk of the droplet 12. In the case of electrowetting wherein the droplet 12 moves, a common technique has been to use a single continuous top plate electrode (not shown) so that the droplet 12 is grounded through the contact with the top plate electrode.

Figure 3:
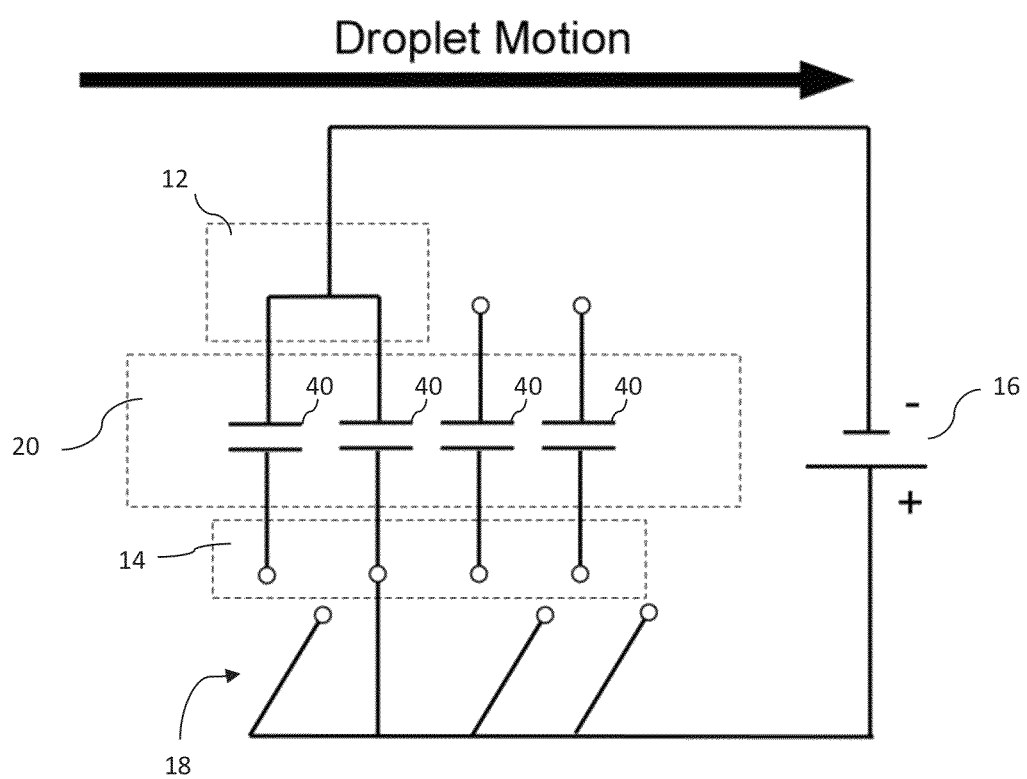
FIG. 3 depicts the idealized equivalent circuit of the prior art EWOD designs for droplet transport.

Continuing with reference to FIG. 3, in the prior art, only one electrode 14 is energized at a time. As such, there is contact angle reduction only on the right side of the droplet 12, resulting in a small motion to the right. Once the droplet has moved to cover the next electrode 14 to the right, the next electrode will be energized energized, and the previously energized electrode 14 will be switched off, resulting in another small amount of movement to the right. In this way, an electrical potential difference is always maintained at the leading edge of the droplet 12.

Figure 4:
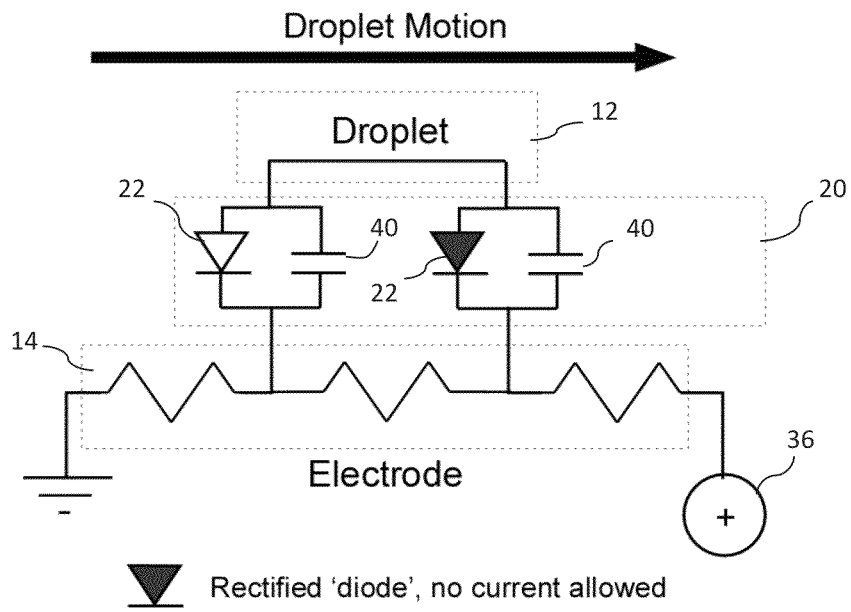
FIG. 4 depicts the idealized equivalent circuit of the claimed invention, which includes a diode, in accordance with an embodiment of the invention.

As illustrated with reference to FIG. 4, the electrowetting system of the claimed invention achieves droplet motion by creating a potential difference between only a portion of the droplet 12 and the substrate by the introduction of a diode 22. Diode 22 permits droplet 12 movement using a much simpler design, and allows for substantially continuous motion of the droplet 12 rather than a step-wise motion which results in small, discrete, steps as in known in the prior art. Moreover, the introduction of a diode 22 into the electrowetting system makes the system dependent upon the polarity of the voltage, providing for the movement of the droplet 12 in both a forward and a reverse direction. Additionally, the entire device consists of a single circuit and does not require a complex control system to control the movement of the droplet 12 along the substrate.

Figure 5:
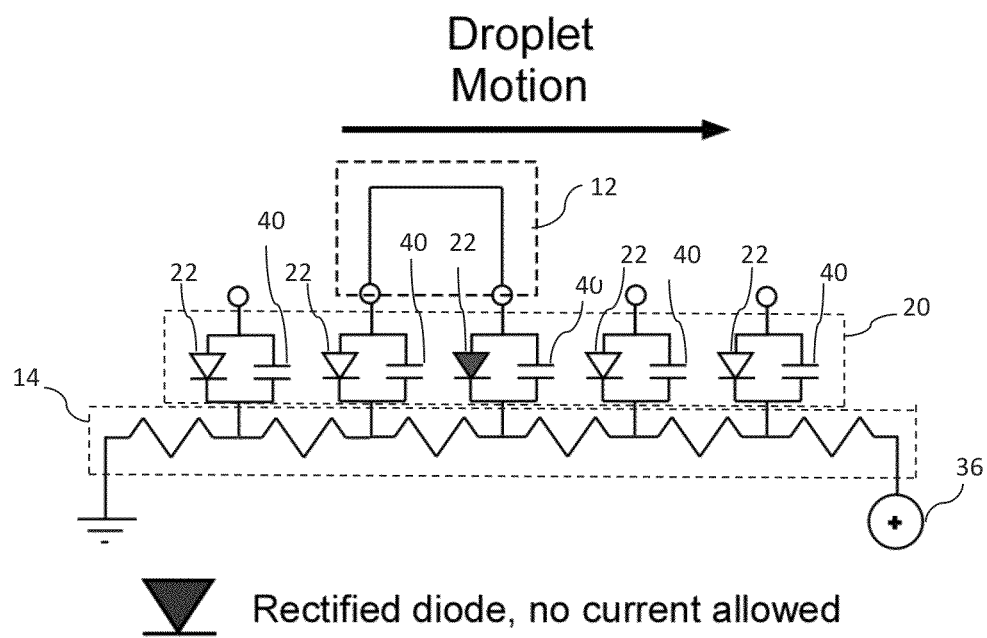
FIG. 5 depicts the idealized equivalent circuit of an array of diode-capacitor sites demonstrating how continuous droplet motion is achieved in accordance with an embodiment of the invention.

As illustrated with reference to FIG. 5, a voltage is applied by a voltage source 36 across a substrate electrode 14 atop which are patterned a series of diodes 22 and capacitors 40 (dielectric layer) in parallel. In this embodiment, any two adjacent diodes 22 will be at a different potential, due to the electrical resistance of the substrate electrode 14. The potential difference is a function of the total voltage applied across the substrate electrode 14 and the geometry of the device, namely the total length of the substrate electrode 14 and spacing between adjacent diodes 22. When two adjacent diodes 22 are connected electrically by the presence of the droplet 12, the more positively charged diode 22, located at the leading edge of the droplet 12, will be reverse-biased, thereby preventing the flow of current. In addition, the more negatively charged diode 22, positioned at the trailing edge of the droplet 12 will be forward-biased, thereby allowing the flow of current. The result is the establishment of a potential difference between the droplet 12 and the substrate electrode 14 at the leading-edge, reverse-biased, diode 22 but not at the more negatively charged, trailing-edge, forward-biased diode 22. This potential difference, combined with the capacitance 40 provided by the dielectric layer, results in a contact angle reduction through electrowetting effects in the area surrounding the reverse-biased diode 22, while the equipotential between the droplet 12 and forward-biased diode 22 means the voltage in the Young-Lippmann equation is essentially zero resulting in no contact angle reduction in the area surrounding the forward-biased diode 22.

To achieve motion of the droplet 12, the prior art required the operator to switch to the next electrode in a series of electrodes to achieve another step of motion, and so on until the total desired motion was complete. In contrast, in accordance with the electrowetting system of the present invention, as depicted with reference to FIG. 5, the step-wise actuation of electrodes is unnecessary. In the present invention, the resistance of the substrate electrode 14 between the diode sites 22 provides for a voltage drop between them, resulting in each diode 22 being at a different potential than any other when covered by a droplet 12. As the droplet moves to the right and covers the next-most positively charged diode 22, that diode will become reverse-biased, preventing current flow and resulting in a potential difference between the droplet 12 and the substrate electrode 14. In addition, the previously reverse-biased diode 22 is now more negatively charged than the newly covered diode 22, and as such becomes forward biased, allowing current flow and eliminating the contact angle reduction. The net effect of all this is that the droplet motion will continue, automatically, across the length of the substrate electrode 14 in the direction of positive voltage gradient until either the pattern of diodes ends or the voltage source 36 is removed, requiring no switching of individual electrodes.

Additionally, the polarity of the applied voltage determines the direction of droplet motion, whereas the prior art electrowetting setups show little to no dependence of response on voltage polarity. Another significant difference between the design of the present invention and the prior art is the lack of need for a top plate electrode. In the claimed invention, the voltage is applied across the substrate electrode 14, not between the droplet 12 and the substrate electrode 14, and the droplet only provides a parallel current path as it covers the various diodes. As such, the need for a top plate electrode in eliminated from the electrowetting system, allowing more flexibility in the design of the electrowetting devices.

Figure 7:
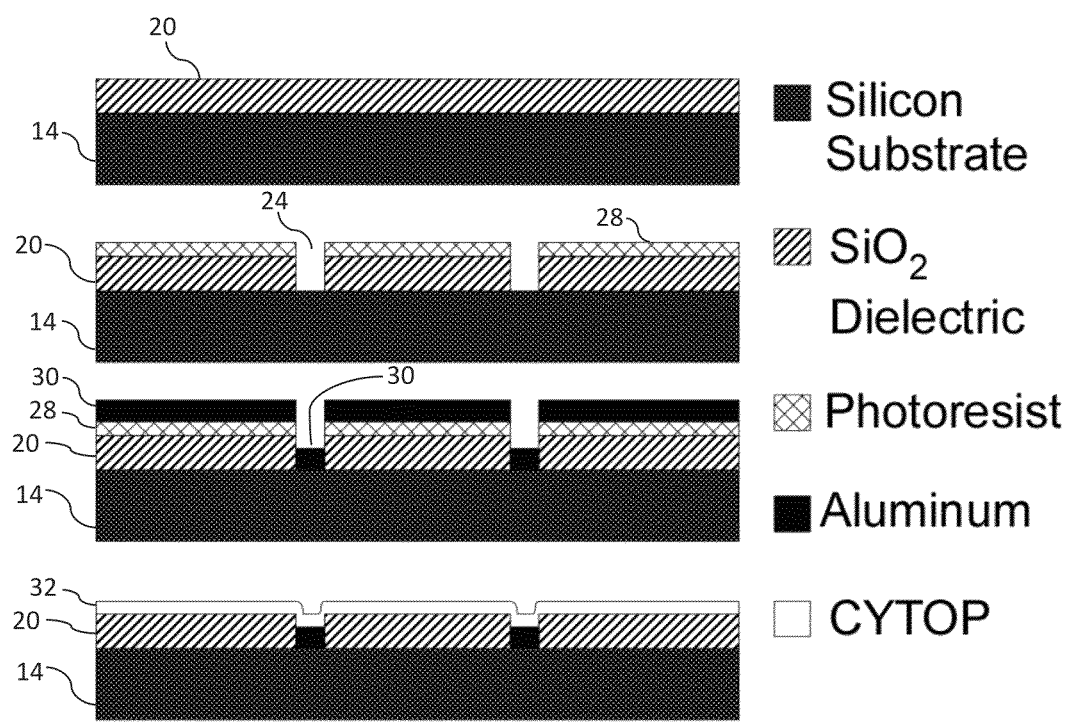
FIG. 7 illustrates the method of fabricating the electrowetting system in accordance with an embodiment of the invention.

In one embodiment, the electrowetting system includes at least four components, each corresponding to one of the idealized electrical components discussed previously and depicted in FIG. 5. With reference to FIG. 7, in this embodiment, the electrowetting system includes a doped silicon electrode substrate 14, which is representative of the resistors shown in FIG. 5. The next component, deposited on the top surface of the electrode substrate 14, is the dielectric layer 20. The dielectric layer 20 provides the majority of the capacitance needed to achieve the electrowetting effect. The next components are the valve metal sites 24. The valve metal sites provide the selective current rectification behavior needed for the electrowetting system to function, and as such can be equated to the diodes 22 discussed previously. The final component includes a thin surface treatment layer 32. While the surface treatment 32 will have an effect on the total capacitance of the system, and as such may be considered as a portion of the capacitor, its major impact is not as an electrical component. In addition to acting as a portion of a composite dielectric layer, the thin surface treatment layer 32 provides significant mechanical benefits to the electrowetting system by providing an extremely non-wetting interface between the droplet 12 and the substrate electrode 14. Alternatively, a hydrophobic material may be used as the dielectric layer 20, eliminating the need for an additional surface treatment layer.

In the electrowetting system of the present invention, the voltage term used in the Young-Lippmann equation to model contact angle reduction is not the total voltage applied across the entire substrate electrode 14, but only the potential difference between the two adjacent valve metal sites 22. As such, the voltage term is a function of the total applied voltage and the spacing between the metal sites, or diodes 22. In order to keep this value high enough to result in a significant difference in contact angle from one side of the droplet 12 to the other side of the droplet 12, and hence cause motion, it is necessary to use voltages much higher than is typical of most prior art EWOD designs wherein the voltage between the electrode and electrolyte of the droplet 12 is the total applied voltage. To keep the current through the substrate electrode 14 and electrolyte of the droplet 12 at a minimum, a high resistivity substrate electrode 14 is used. In a particular embodiment, for availability and compatibility with microfabrication techniques, a large doped silicon wafer is used as a substrate electrode 14 in one embodiment, and once fabrication is completed, individual devices are diced from the silicon wafer.

In an embodiment of the invention wherein the substrate electrode 14 is a silicon wafer substrate, the simplest dielectric layer 20 to use is a thermally-grown silicon dioxide ($SiO_2$) layer. The $SiO_2$ provides a robust dielectric layer that is easily grown, patterned and etched with standard microfabrication techniques, and provides satisfactory performance as a dielectric layer.

In order for the necessary selective current to flow between the diodes and provide movement of the droplet 12, it is necessary to position the diodes 22 at regular intervals. The required spacing of the diodes 22 is accomplished by exposing periodically spaced portions of the substrate electrode 14 by removing the dielectric layer 20 in these portions. In an exemplary embodiment, this is achieved by patterning small circular holes 24 in the dielectric layer 20. Alternative designs could include strips of removed dielectric 20 oriented perpendicular to the direction of the desired droplet 12 movement.

The spacing of the holes, or sites, fabricated in the dielectric layer 20, and subsequently the location of the diodes 22, is a key design parameter. The spacing of the holes 24 must be such that for a given diameter droplet 12, at least two sites are always covered by the droplet 12. If at any time a droplet 12 covers only one diode site 22, the equivalent circuit would not include parallel paths through both the substrate electrode 14 and the electrolyte droplet 12, as current would only flow through the substrate, and droplet motion would cease. In the alternative, if the diode 22 spacing is made too small, the voltage drop between any two adjacent diodes would be such that the effective voltage across the voltage drop would not be sufficient to ensure significant contact angle reduction at the leading edge, and droplet motion would cease.

In a specific embodiment, a valve metal layer 30 is positioned at the bottom of the holes through the dielectric layer 20, separating the exposed electrode 14 from the droplet 12. If this layer were not present, current could flow indiscriminately between the electrode 14 and the droplet 12 at all the hole sites. The diode-like current rectification properties of the valve metals allows for current to flow only when the valve metal is more negatively charged than the electrolyte of the droplet 12. In a particular embodiment, the valve metal layer 30 is aluminum. Aluminum is a valve metal which exhibits robust diode-like properties and is easy to deposit in pure layers of controlled thicknesses.

Metals commonly considered valve metals include tantalum, niobium, aluminum, zirconium, hafnium, tungsten, bismuth and antimony. Other elements, namely beryllium, magnesium, silicon, germanium, tin, titanium, and uranium, exhibit some of these properties and are sometimes counted in the ranks of valve metals. Successful actuation has been demonstrated with both aluminum and silicon sites. The use of silicon is favorable because it eliminates the need for depositing metal in the dielectric holes if a silicon substrate is used.

In another embodiment of the present invention, a hydrophobic surface treatment 32 is applied to the entire top surface of the finished electrowetting system. The addition of a hydrophobic surface treatment 32 aids in strong and dependable electrowetting behavior. By increasing the natural contact angle, the hydrophobic surface allows for contact angle reductions of greater magnitude. In addition, it has been shown that a highly hydrophobic layer also reduces the severity of hysteresis. The Young-Lippmann equation indicates that the contact angle reduction for a given voltage should be identical, regardless of whether the angle is advancing or retreating, and the corresponding voltage is increasing or decreasing. The hydrophobic surface treatment 32 reduces hysteresis, allowing for more dependable performance. Also, when the intent of a EWOD design is to achieve droplet transport, hydrophobic layers tend to reduce the occurrence of 'pinning,' where a portion of the droplet 12 adheres to the substrate. This pinning can result in either the cessation of droplet motion, or if the actuation force acting on the droplet 12 is sufficient it may cause a portion of the droplet 12 to continue its motion while the remainder of the droplet 12 remains anchored to the area where the pinning occurred, causing the droplet 12 to separate into two portions To reduce the chances of pinning of the droplet 12 at the valve metal sites, the hydrophobic layer 32 covers the entire surface of the wafer. On first examination it would seem that the addition of a dielectric layer atop the valve metal would reduce or eliminate the necessary current flow at the negatively charged (trailing edge) site. However, the surface treatment layer 32 applied is very thin and has a relatively low dielectric constant. Adequate current leakage occurs across this layer that it does not significantly reduce the performance of the electrowetting, due to its natural porosity, and defects or other electrically conductive pathways.

A key benefit of the hydrophobic layer 32 is its effect on the natural contact angle of the droplet-surface interface, which helps in achieving droplet motion in two related ways. First, by starting off with a larger natural contact angle, the total possible change in contact angle is greater. Secondly, since the actuation force acting on the droplet is the result of the asymmetry in contact angle from leading to trailing edge, the greatest actuation force is achieved by having the greatest possible natural contact angle and reducing it to the lowest value possible on the leading edge. As mentioned above, the additional thickness provided by the hydrophobic layer and its dielectric properties has the effect of decreasing the total capacitance between the electrode 14 and droplet 12, which has an impact on electrowetting performance. The magnitude of this impact is determined by the hydrophobic characteristics of the layer used and its associated dielectric constant, in addition to the thickness of the applied layer. In a particular embodiment, CYTOP™ 809M (Asahi Glass) is useful as a hydrophobic surface treatment. This fluoropolymer provides a large natural contact angle and is easily applied in thin, consistent-thickness, layers.

In a particular embodiment, an electrowetting on dielectric system is provided which includes aluminum electrodes and 2.1 μm thick CYTOP™ dielectric layers. Defects in the dielectric layer were introduced by scratching the samples with a probe tip on a micropositioner. A 50 μl droplet of 1 mM NaCl solution was placed over the scratched area and voltage was applied to a probe placed in the droplet while the aluminum electrode was grounded. Aluminum self-passivates and prevents current flow in one direction, thereby creating an electrochemical diode-like electrical behavior with diode breakdown voltage over 100 V.

With reference to FIG. 7, an electrowetting system in accordance with the present invention was manufactured using microfabrication techniques, including thermal oxidation, photolithographic patterning and etching, electron-beam vapor deposition, and spin-coating. The substrate 14 used for all iterations produced was a 4" diameter 270 μm thick wafer of silicon, N-doped to a resistivity 300-500 Ω/cm. Using a predictive model and assuming test strip widths of 8.98 mm, the resistivity level results in Joule heating of 0.37 to 0.62 W/cm$^2$, depending on where in the range of given resistivities the wafer is. Atop this wafer 14, an oxide layer 20 was grown using dry thermal oxidation to a final oxide thickness of 480 nm.

Initially, several wafers were oxidized simultaneously to the same final thickness, with those not ready for immediate further processing set aside for later use. Later in the testing process it was decided that it would desirable to fabricate wafers with a slightly thinner oxide layer 20. Before further processing of these wafers, they were immersed in a standard hydrofluoric acid buffered oxide etch (BOE) to reduce total thickness to approximate 350 nm. Once the wafers held the desired thickness of oxide, they were prepared for photolithography.

In one embodiment, photolithography is accomplished by first spin-coating a primer of Hexamethyldisilazane (HMDS) to ensure a good bond between oxide 20 and photoresist 28. After priming, a layer of Shipley S1813 positive photoresist 28 was applied via spin-coat. After spin-coating the wafer was subjected to a soft bake on a hotplate at 100° C. It was then masked and exposed, then submersed in Microposit MF-319 developer to remove the portions of photoresist that were exposed to UV during the exposure step. After a hard bake for one minute at 100° C. the now-exposed portions of oxide were etched away down to bare silicon 14 by BOE to form the holes 24 in the dielectric.

After the photolithographic process is completed, but before removal of the unexposed photoresist 28, the entire wafer was coated with a layer of aluminum 30 using electron-beam physical vapor deposition. Final thickness of the aluminum layer 30 was 300 nm. This step results in aluminum 30 covering the entire wafer, while the desired result is to have aluminum only at the bottom of the holes 24 etched in the dielectric layer 20 during photolithography as well as small strips of aluminum deposited directly to the substrate electrode on each end, to aid in making electrical contacts). Since the photoresist layer 28 remains covering all those areas which still have an oxide layer 20, when it is removed by rinsing in acetone it takes with it the aluminum 30 that was deposited atop it. After this liftoff procedure, the result is a silicon wafer 14 with an oxide layer 20 atop it. In this oxide layer 20 are a series of patterned holes 24, at the bottom of which, and deposited directly atop the bare silicon, each contains a layer of aluminum 30.

Following the above procedure, the surface treatment layer 32 is applied. The initial test wafer design called for a final CYTOP 32 thickness of 180 nm. This was achieved using spin-coating. For each step, once the final spin speed is reached it is maintained until the total step duration has been reached In additional embodiments of the invention, it may be possible to create or improve diode-like characteristics of the electrowetting system by applying particular electrolytes. Diode-like behavior may be achieved based solely on the choice of the electrolyte. For example, Citric Acid and Tartaric Acid are known to improve the passivation of aluminum with would improve the diode-like characteristics of the electrowetting system. In addition, the aluminum deposit may be eliminated from the system and the silicon electrode itself may be doped to provide the diode behavior of the system.

In addition to the electrochemical diodes described in the previous embodiments, it is additionally within the scope of the present invention to utilize metal-semiconductors diodes, such as Schottky diodes in the electrowetting system, to increase the lifetime of the system. The use of metal-semiconductor diodes is advantageous because when only electrochemical diodes are used, the reverse biased current is limited by the anodizing of the metal that is present in the voids created in the dielectric. In operation, as the droplet shifts its position, the forward biased diode has to supply enough current to remove the anodized oxide layer and then etch away some of the metal underneath the oxide layer. Every time the droplet passes over the diode, the cycle repeats. The limiting factor for electrochemical diodes in the electrowetting system is that in the reversed biased case, a large current can thicken the oxide and make it difficult for the forward biased current to pass through. Also, as the cycle continues, the working metal (aluminum) can get etched away, resulting in the formation of cracks and pits in the substrate.

Figure 6:
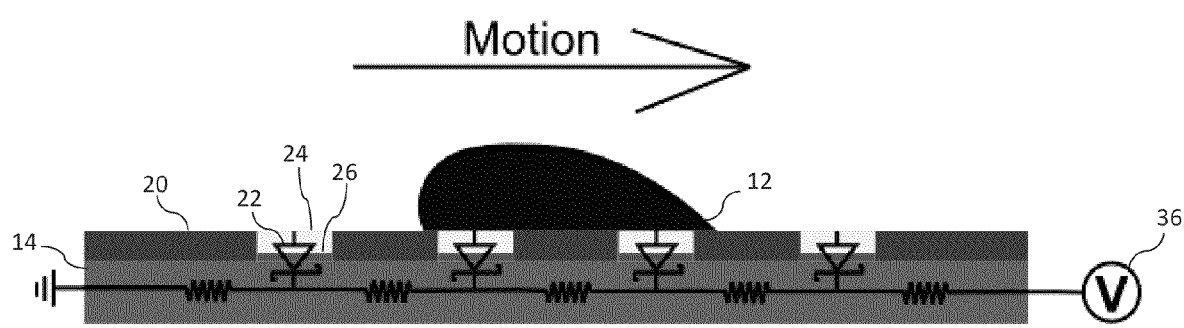
FIG. 6 illustrates an exemplary embodiment of the invention incorporating a metal-semiconductor diode.

With reference to FIG. 6, an embodiment of the electrowetting system of the present invention having an improved device lifetime is illustrated having a metal-silicon junction diode. It is known in the art that metal-silicon junctions can form either rectifying or resistive contacts, depending on the doping level of the silicon at the junction. The rectifying behavior of the metal-silicon junction resulting from particular doping levels of the silicon and the metal is commonly referred to as a Schottky contact or Schottky diode. For a low concentration of dopant (typically phosphorus in n-type silicon) the rectifying behavior of the metal-silicon junction is utilized to construct Schottky diodes. Metal-semiconductor diodes do not suffer from the limitations of electrochemical diodes previously described because metal-semiconductor diodes are a result of the mismatching the band gap between the semiconductor and the metal. In a metal-semiconductor diode, as long as a voltage is applied across the metal electrode, the metal-semiconductor junction will always behave as a diode.

In a particular embodiment of the electrowetting system utilizing metal-semiconductors diodes, on the semiconductor side of the diode, n-type high resistivity silicon (Si) is the ideal choice because in order to be resistive, the dopant concentration of the semiconductor has to be relatively low. Other suitable materials for the semiconductor include, other low level dopant semiconductors, such as silicon carbide (SiC) and gallium arsenide (GaAs). While lightly-doped p-type semiconductors may also be used as the semiconductor, the selection of the pairing metal is limited due to the fact that metals that form metal-semiconductor junctions on n-type semiconductors will form ohmic contacts on p-type material. For the metal side of the metal-semiconductor junction, all metals commonly used in micro-fabrication can be employed in the device. Exemplary metals, include, but are not limited to, gold (Au), platinum (Pt), silver (Ag), copper (Cu), aluminum (Al) and titanium (Ti).

An additional advantage of using metal-semiconductor diodes in the electrowetting system is that the electrolytes can be any conductive liquid that will form a conductive path in parallel with the conductive path through the metal electrode. The use of metal-semiconductor diodes allows a broader range of fluid droplets to be used. In particular, a number of biological fluids and reagents currently used in lab-on-chip devices can be actuated by an electrowetting system employing Schottky diodes. In addition, utilizing noble metals, such as gold and platinum, the corrosive effect on the metal under an electric, resulting in passivation and etching of the substrate, will be minimal. If corrosion is eliminated from the electrowetting system by utilizing metal-semiconductor diodes instead of electrochemical diodes, in an ideal case, the electrowetting system would operate indefinitely.

In an additional embodiment, the metal-semiconductor diodes can also be placed in series with the electrochemical diodes to improve the performance of the electrowetting devices having electrochemical diodes. For such combined diodes, the reverse biased current is lowered by the Schottky diode and the forward biased current is maintained, as a result of the low forward voltage drop of the Schottky diode. Accordingly, metal-semiconductor diodes can be used as standalone diodes in an electrowetting system or in series with existing electrochemical diodes to improve the performance of the continuous electrowetting device.

It will thus be seen that the objects set forth above, and those made apparent from the foregoing disclosure, are efficiently attained. Since certain changes may be made in the above construction without departing from the scope of the invention, it is intended that all matters contained in the foregoing disclosure or shown in the accompanying drawings shall be interpreted as illustrative and not in a limiting sense.

It is also to be understood that the following claims are intended to cover all of the generic and specific features of the invention herein disclosed, and all statements of the scope of the invention that, as a matter of language, might be said to fall there between.

GLOSSARY OF CLAIM TERMS

Electrowetting: modification of the ability of a liquid to maintain contact with a solid surface with an applied electric field Dielectric: an electrical insulator that can be polarized by an applied electric field.

Diodes: a two-terminal electronic component with an asymmetric transfer characteristic.

Hydrophobic: the physical property of a molecule that is repelled from a mass of water.

Doping: intentionally introducing impurities into an extremely pure semiconductor for the purpose of modulating electrical properties.

Wafer: thin slice of semiconductor material.

Photoresist: light sensitive material.

Fluoropolymer: a fluorocarbon based polymer with strong carbon-fluorine bonds. Characterized by a high resistance to solvents, acids, and bases.

What is claimed is:

1. An electrowetting system for the movement of a droplet regardless of voltage polarity, the system comprising:

an electrode layer adapted to act as a resistor in the electrowetting system;

a dielectric layer disposed in overlying relation to the electrode layer, the dielectric layer adapted to act as a capacitor in the electrowetting system; and a plurality of diodes disposed within the dielectric layer, the plurality of diodes adapted to act as diodes in parallel with the dielectric layer and wherein adjacent diodes of the plurality of diodes are sufficiently spaced apart to establish a potential difference between a leading edge and a trailing edge of an electrolyte droplet positioned in overlying relation to the dielectric layer in response to a voltage applied across the electrode layer.

2. The electrowetting system of claim 1, further comprising a hydrophobic surface treatment layer disposed in overlying relation to the dielectric layer, the hydrophobic surface treatment layer adapted to act as a capacitor in parallel with the dielectric layer and the plurality of diodes.

3. The electro wetting system of claim 2, further comprising an electrolyte droplet disposed in overlying relation to the hydrophobic surface treatment layer.

4. The electrowetting system of claim 3, wherein the plurality of diodes disposed in the dielectric are spaced apart such that at least two of the diodes are simultaneously covered by the electrolyte droplet.

5. The electrowetting system of claim 2, wherein the hydrophobic surface treatment layer is a fluoropolymer.

6. The electrowetting system of claim 1, wherein the electrode layer is a doped silicon wafer.

7. The electrowetting system of claim 1, wherein the dielectric layer is silicon dioxide.

8. The electrowetting system of claim 1, wherein the plurality of diodes are electrochemical diodes.

9. The electrowetting system of claim 1, wherein the plurality of diodes are electrochemical diodes comprising a metal electrode exposed to an aqueous solution.

10. The electrowetting system of claim 1, wherein each of the plurality of diodes comprises an aluminum electrode exposed to an aqueous solution comprising compounds selected from the group consisting of NaCl, NaSO4, Citric Acid, and Tartaric acid.

11. The electrowetting system of claim 1, wherein the plurality of diodes are metal-semiconductor diodes.

12. The electrowetting system of claim 1, wherein the electrode layer is a semiconductor layer and wherein each of the plurality of diodes are metal-semiconductor diodes comprising a metal electrode.

13. The electrowetting system of claim 12, wherein the metal electrode is selected from the group of metals consisting of gold (Au), platinum (Pt), silver (Ag), copper (Cu), aluminum (Al) and titanium (Ti).

14. The electrowetting system of claim 12, wherein the semiconductor layer is a doped silicon layer.

15. The electrowetting system of claim 12, wherein the semiconductor layer is and n-type silicon layer comprising a dopant selected from the group consisting of phosphorus (P), silicon carbide (SiC), and gallium arsenide (GaAs).

16. The electrowetting system of claim 1, wherein the plurality of diodes are Schottky diodes.

17. The electrowetting system of claim 1, wherein a first plurality of the plurality of diodes are electrochemical diodes and a second plurality of the plurality of diodes are metal-semiconductor diodes.

18. The electrowetting system of claim 1, wherein each of the plurality of diodes comprises a valve metal electrode.

19. An electrowetting system for the movement of a droplet regardless of voltage polarity, the system comprising:

an electrode layer adapted to act as a resistor in the electrowetting system;

a dielectric layer disposed in overlying relation to the electrode layer, the dielectric later adapted to act as a capacitor is the electrowetting system;

a plurality of diodes disposed within the dielectric layer, the plurality of diodes adapted to act as diodes in parallel with the dielectric layer;

a hydrophobic surface treatment layer disposed in overlying relation to the dielectric layer, the hydrophobic surface treatment layer adapted to act as a capacitor in parallel with the dielectric layer and the plurality of diodes;

an electrolyte droplet disposed in overlying relation to the hydrophobic surface treatment layer;

a voltage source, coupled to the electrode layer; and wherein adjacent diodes of the plurality of diodes are sufficiently spaced apart to establish a potential difference between a leading edge and a trailing edge of the electrolyte droplet positioned in overlying relation to the dielectric layer in response to the voltage source applied across the electrode layer, the potential difference effective in moving the electrolyte droplet between the plurality of diodes.

20. A method of effecting movement of an electrolyte droplet on the surface of an electrowetting system comprising an electrode layer adapted to act as a resistor in the electrowetting system, a dielectric layer disposed in overlying relation to the electrode layer, the dielectric layer adapted to act as a capacitor in the electrowetting system and a plurality of diodes disposed within the dielectric layer, the plurality of metal-semiconductor diodes adapted to act as diodes in parallel with the dielectric layer, the method comprising:

positioning an electrolyte droplet on the surface of the electrowetting system and in overlying relation to two adjacent diodes of the plurality of diodes; and applying a voltage source across the electrode layer, wherein the two adjacent diodes of the plurality of diodes are sufficiently spaced apart to establish a potential difference between a leading edge and a trailing edge of the electrolyte droplet positioned in overlying relation to the dielectric layer in response to the voltage source applied across the electrode layer, the potential difference effective in moving the electrolyte droplet between the plurality of diodes.

* * * * *

UNITED STATES PATENT AND TRADEMARK OFFICE
CERTIFICATE OF CORRECTION

PATENT NO. : 9,182,591 B2
APPLICATION NO. : 14/471785
DATED : November 10, 2015
INVENTOR(S) : Nathan B. Crane et al.

Page 1 of 1

It is certified that error appears in the above-identified patent and that said Letters Patent is hereby corrected as shown below:

In the Claims

Column 11, Claim 3, Line 19 should read:

3. The electrowetting system of claim 2, further compris-

Column 12, Claim 19, Line 14 should read:

trode layer, the dielectric layer adapted to act as a capaci-

Signed and Sealed this
Twenty-ninth Day of March, 2016

Michelle K. Lee
*Director of the United States Patent and Trademark Office*